United States Patent
Garcia-Tobin et al.

(10) Patent No.: US 12,386,755 B2
(45) Date of Patent: Aug. 12, 2025

(54) DATA PROCESSING APPARATUS AND METHOD FOR ADDRESS TRANSLATION

(71) Applicant: Arm Limited, Cambridge (GB)

(72) Inventors: Carlos Garcia-Tobin, Ely (GB); Bruce James Mathewson, Papworth Everard (GB); Matthew Lucien Evans, Cambridge (GB); Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 56 days.

(21) Appl. No.: 18/263,665

(22) PCT Filed: Feb. 2, 2022

(86) PCT No.: PCT/GB2022/050270
§ 371 (c)(1),
(2) Date: Jul. 31, 2023

(87) PCT Pub. No.: WO2022/167789
PCT Pub. Date: Aug. 11, 2022

(65) Prior Publication Data
US 2024/0095183 A1   Mar. 21, 2024

(30) Foreign Application Priority Data

Feb. 4, 2021   (GB) ..................... 2101557

(51) Int. Cl.
*G06F 12/1009*   (2016.01)
*G06F 12/1027*   (2016.01)

(52) U.S. Cl.
CPC ...... *G06F 12/1009* (2013.01); *G06F 12/1027* (2013.01)

(58) Field of Classification Search
CPC ............ G06F 12/1027; G06F 12/1009; G06F 12/089; G06F 12/10; G06F 12/0891; G06F 2212/657; G06F 2212/68
See application file for complete search history.

(56) References Cited

U.S. PATENT DOCUMENTS

2015/0278084 A1    10/2015   Bybell et al.
2015/0347300 A1 *  12/2015   Gschwind ............ G06F 3/0644
                                                          711/130

(Continued)

FOREIGN PATENT DOCUMENTS

| GB | 2565069 | 2/2019 |
| GB | 2570474 | 7/2019 |
| WO | 2015/181687 | 12/2015 |

OTHER PUBLICATIONS

Kumar et. al., "Comparative Study and Performance Anlaysis of Cache Coherence Protocols", May 30, 2017, International Journal of Computer Science and Engineering, vol. 5 Issue 5 pp. 213-216 (Year: 2017).*

(Continued)

*Primary Examiner* — Curtis James Kortman
(74) *Attorney, Agent, or Firm* — NIXON & VANDERHYE P.C.

(57) ABSTRACT

An apparatus and method are provided for storing a plurality of translation entries in a cache, each translation entry corresponding to one of a plurality of page table entries and defining a translation between a first address and a second address, and encoding control information indicative of an attribute of each page table entry; returning, in response to a lookup querying a first lookup address, a corresponding second address when the first lookup address corresponds to one of the plurality of translation entries stored in the cache; modifying at least some of the control information in response to notification of a modification of the attribute in (Continued)

Figure 1:
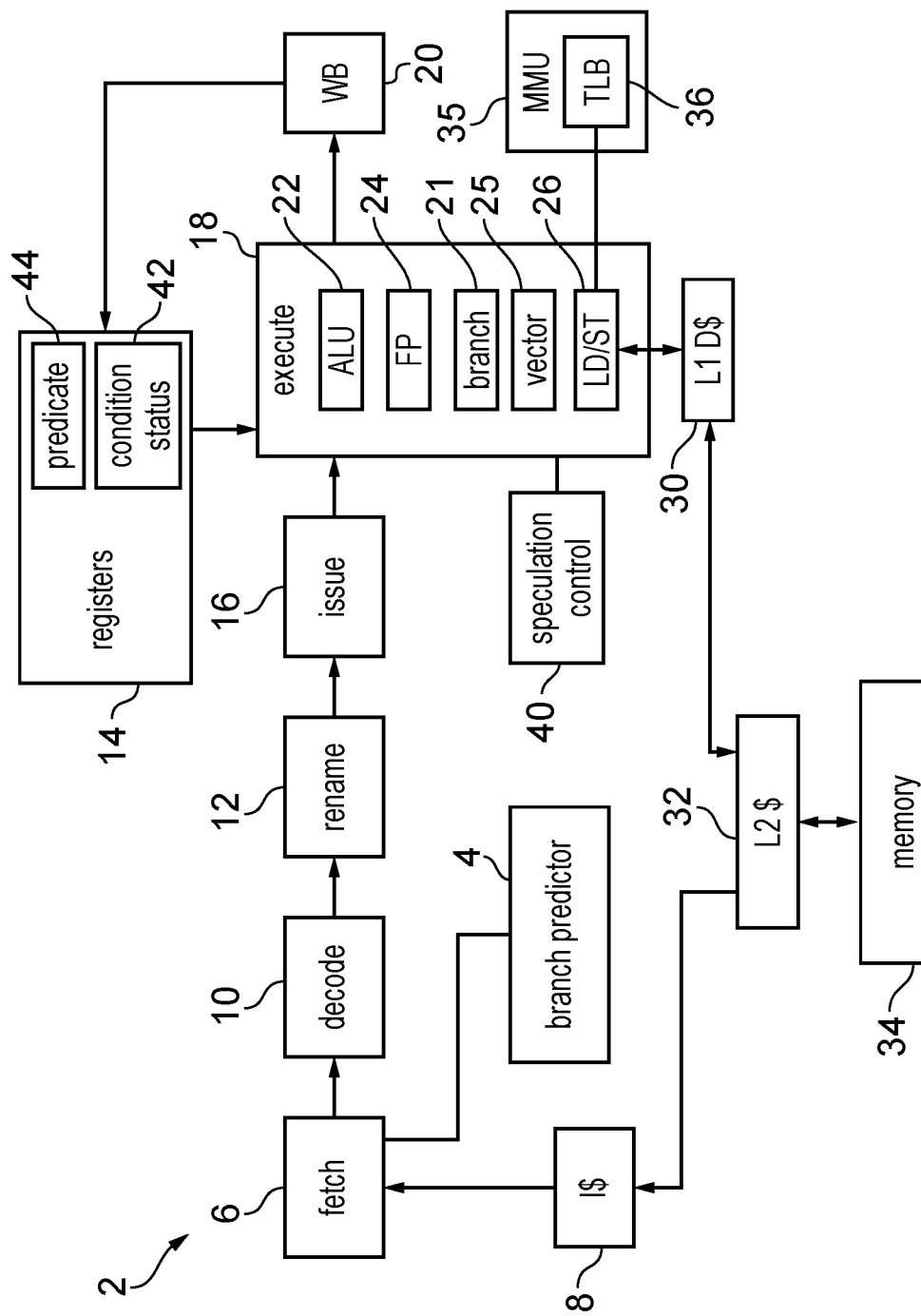

a page table entry; and retaining in the cache at least one translation entry corresponding to the page table entry for use in a subsequent address lookup querying a corresponding first lookup address in response to the notification of the modification of the attribute in the page table entry.

21 Claims, 12 Drawing Sheets

(56) References Cited

U.S. PATENT DOCUMENTS

| | | | | |
|---|---|---|---|---|
| 2015/0363325 | A1* | 12/2015 | Baskakov | G06F 12/12 |
| | | | | 711/173 |
| 2017/0147500 | A1 | 5/2017 | Furman et al. | |
| 2019/0004883 | A1 | 1/2019 | Asbe et al. | |
| 2019/0163641 | A1* | 5/2019 | Cooray | G06F 12/1027 |
| 2020/0183853 | A1* | 6/2020 | Williams | G06F 12/1027 |

OTHER PUBLICATIONS

Combined Search and Examination Report in GB Application No. 2101557.3 dated Nov. 3, 2021, 11 pages.
International Search Report and Written Opinion of the International Searching Authority for PCT/GB2022/050270 dated Mar. 16, 2022, 15 pages.

\* cited by examiner

DATA PROCESSING APPARATUS AND METHOD FOR ADDRESS TRANSLATION

The disclosure relates to a data processing apparatus, and in particular, to translation circuitry.

When an attribute of a page table entry is modified, cached translation entries corresponding to the page table entry may be rendered incorrect. It is therefore necessary to invalidate the translation entries stored in the cache to ensure that incorrect translation entries are not used during data processing. Hence, a lookup querying an address for an invalidated entry will miss in the cache resulting in a slower translation.

In a first aspect, the present invention provides a data processing apparatus comprising:
  a cache to store a plurality of translation entries, each translation entry corresponding to one of a plurality of page table entries and defining a translation between a first address and a second address, and to encode control information indicative of an attribute of each page table entry; and
  translation circuitry to, in response to a lookup querying a first lookup address, return a corresponding second address when the first lookup address corresponds to one of the plurality of translation entries stored in the cache,
  wherein in response to notification of a modification of the attribute in a page table entry:
    at least some of the control information is modified; and
    at least one translation entry corresponding to the page table entry is retained in the cache for use in a subsequent address lookup querying the first lookup address.

In another aspect, the present invention provides a data processing apparatus comprising:
  means for storing a plurality of translation entries in a cache, each translation entry corresponding to one of a plurality of page table entries and defining a translation between a first address and a second address, and encoding control information indicative of an attribute of each page table entry;
  means for returning, in response to a lookup querying a first lookup address, a corresponding second address when the first lookup address corresponds to one of the plurality of translation entries stored in the cache;
  means for modifying at least some of the control information in response to notification of a modification of the attribute in a page table entry; and
  means for retaining in the cache at least one translation entry corresponding to the page table entry for use in a subsequent address lookup querying the first lookup address in response to the notification of the modification of the attribute in the page table entry.

In another aspect, the present invention provides a method of data processing:
  storing a plurality of translation entries in a cache, each translation entry corresponding to one of a plurality of page table entries and defining a translation between a first address and a second address, and encoding control information indicative of an attribute of each page table entry;
  returning, in response to a lookup querying a first lookup address, a corresponding second address when the first lookup address corresponds to one of the plurality of translation entries stored in the cache;
  modifying at least some of the control information in response to notification of a modification of the attribute in a page table entry; and
  retaining in the cache at least one translation entry corresponding to the page table entry for use in a subsequent address lookup querying the first lookup address in response to the notification of the modification of the attribute in the page table entry.

Figure 2A:
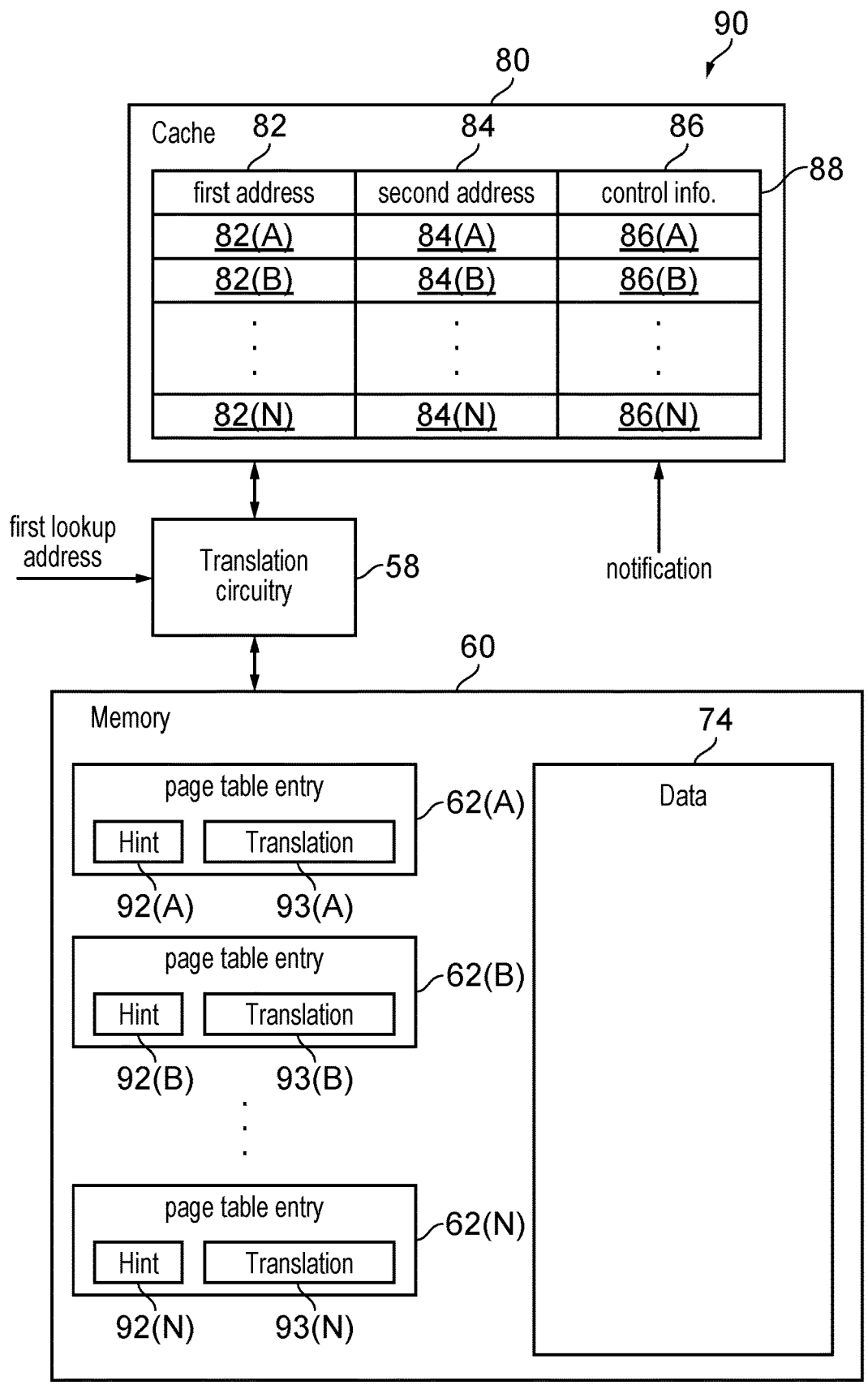
Figure 2B:
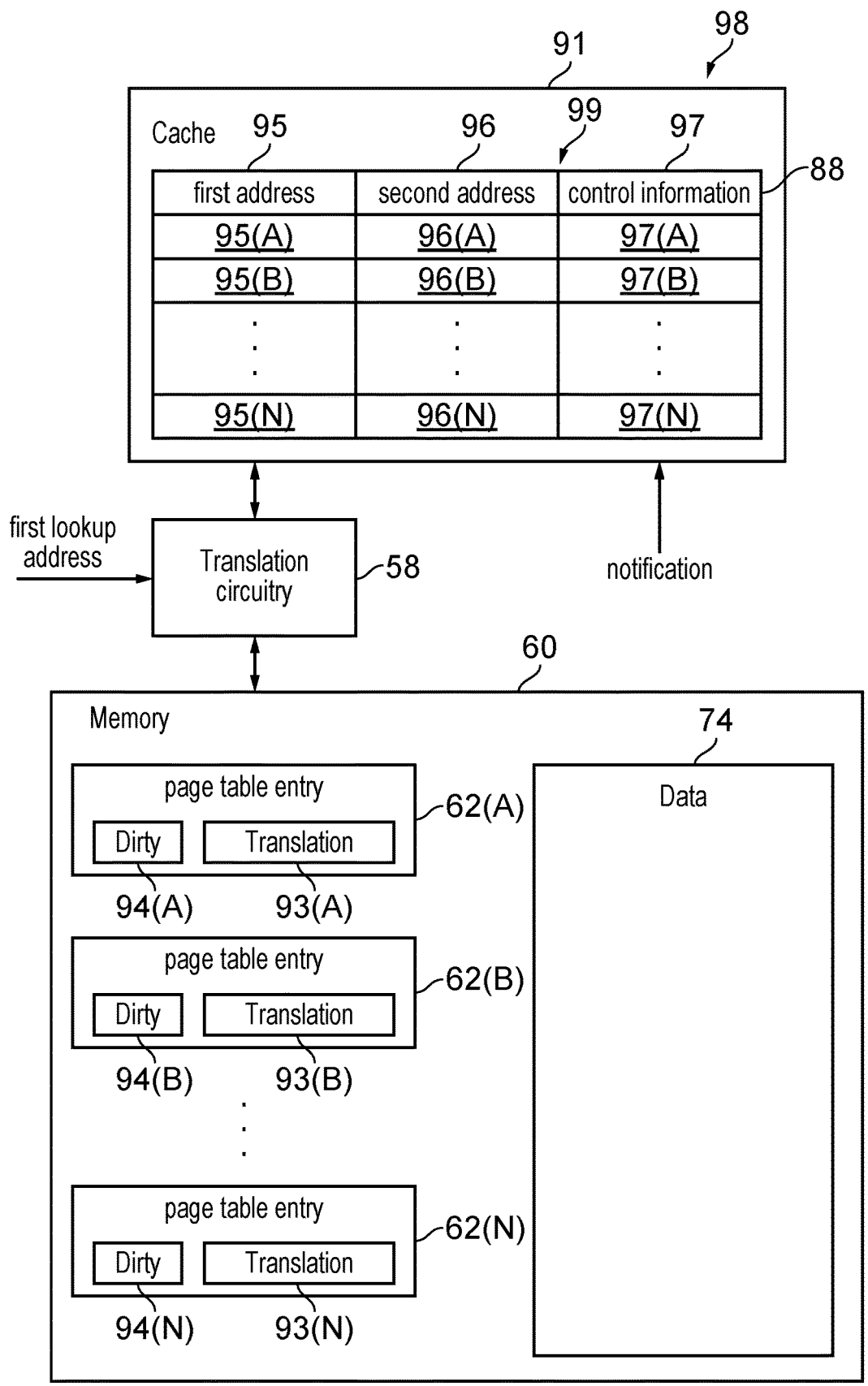
Figure 3:
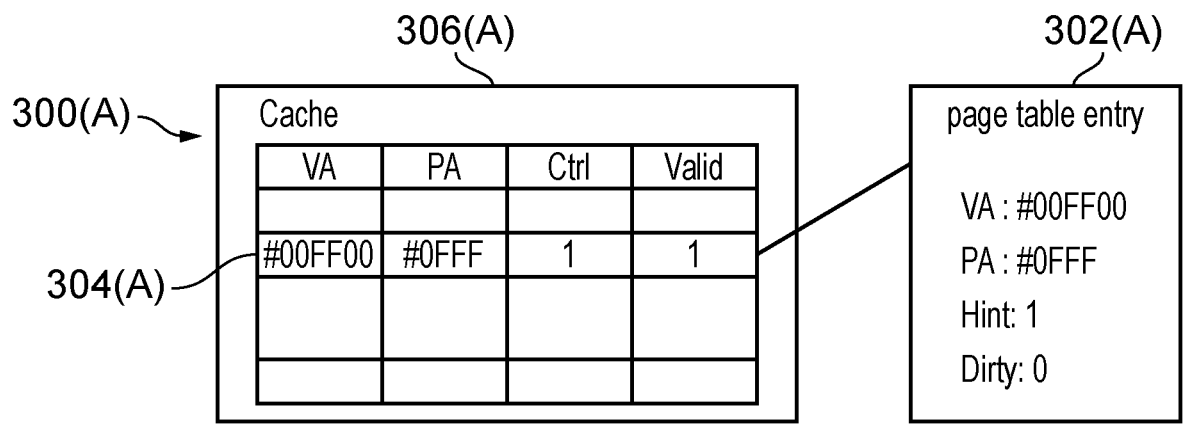
Figure 4:
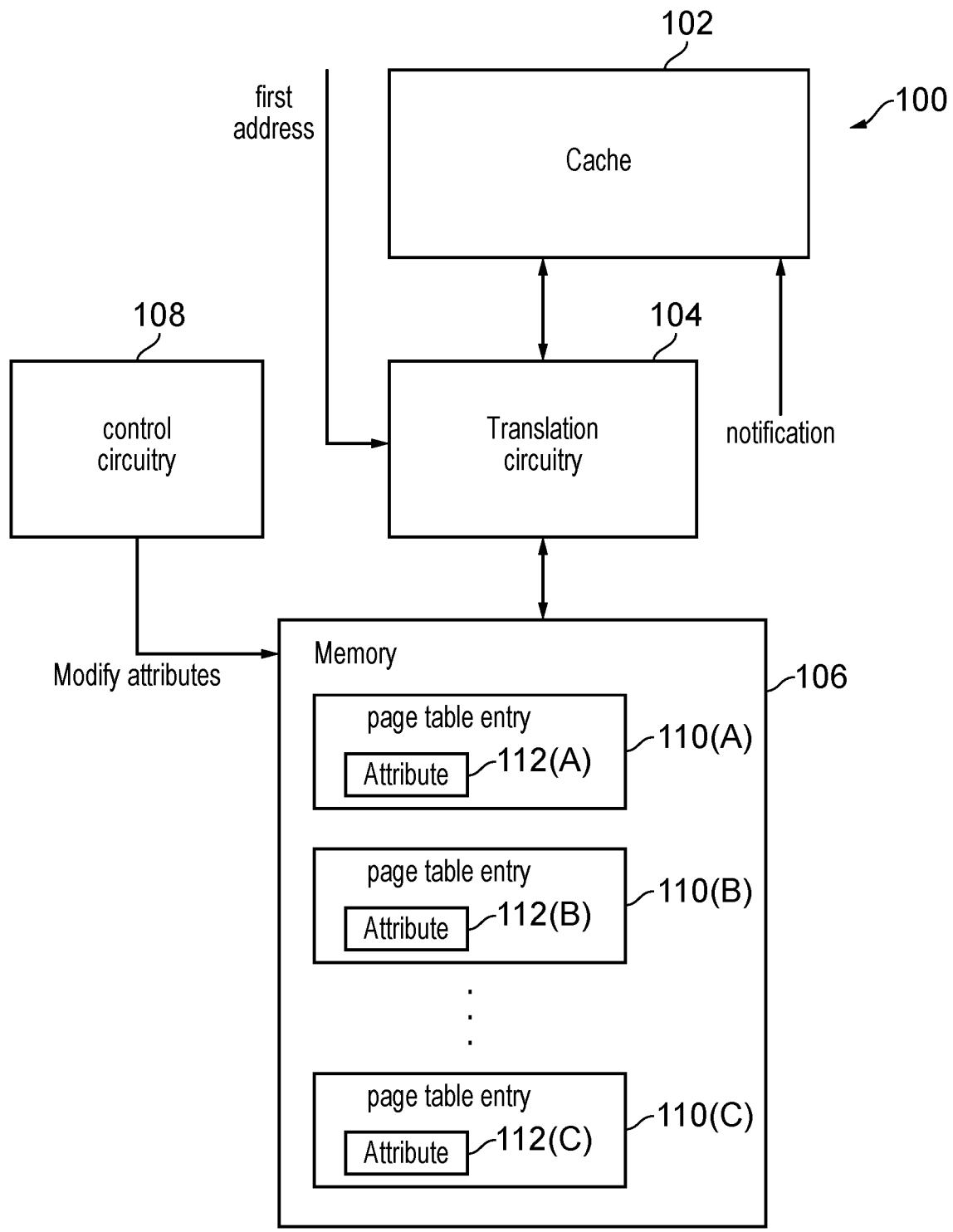
Figure 5:
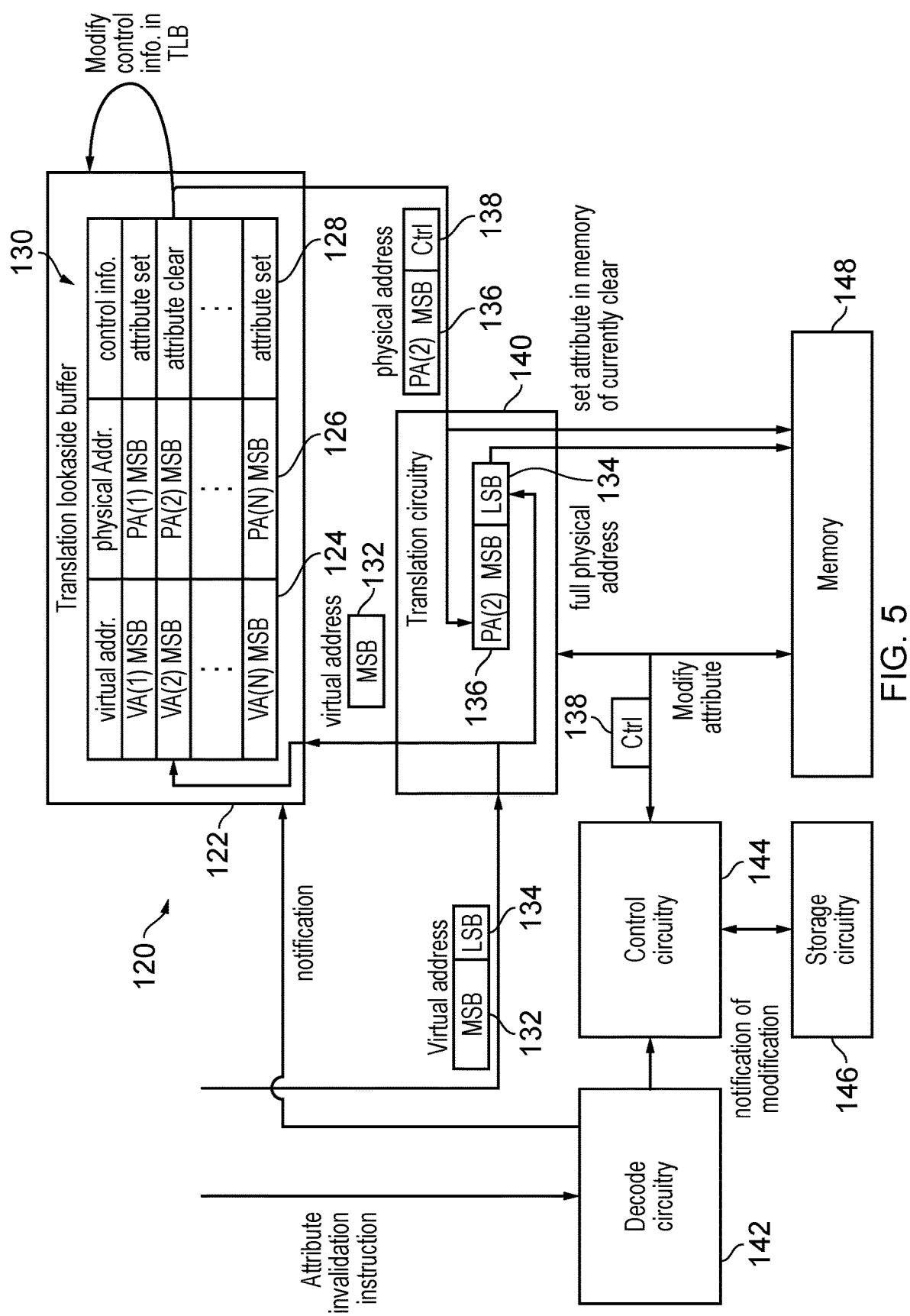
Figure 6:
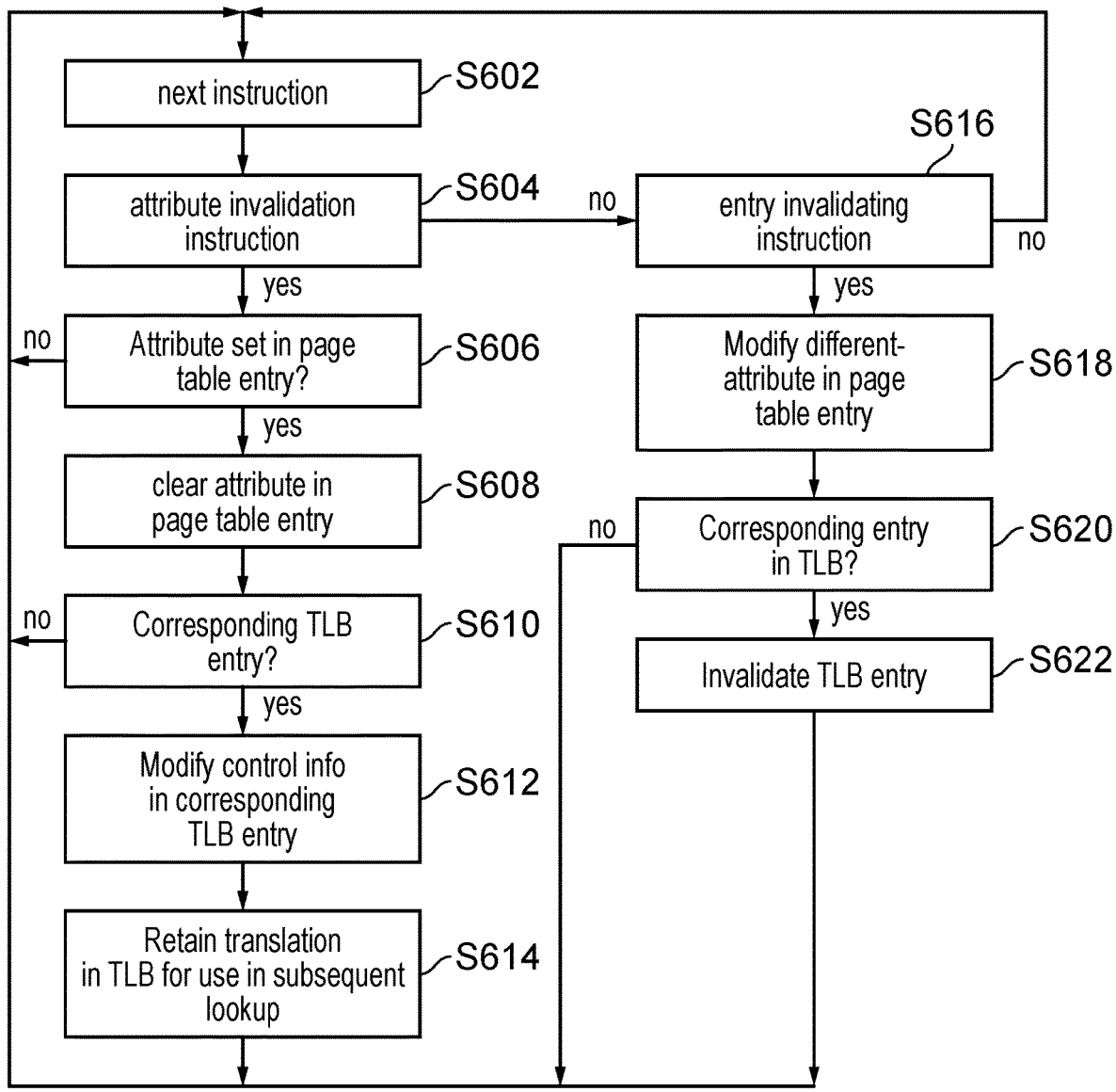
Figure 7:
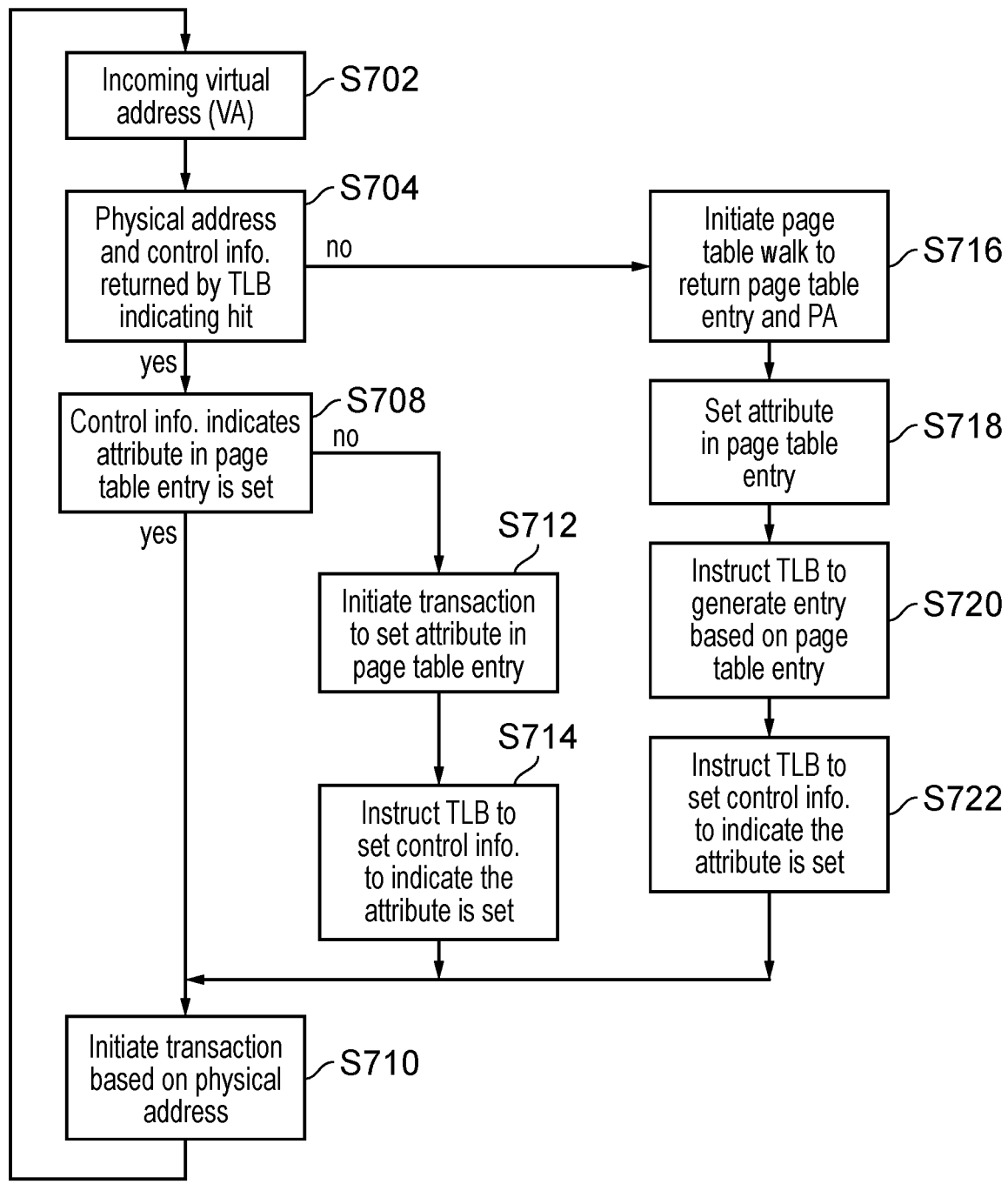
Figure 8:
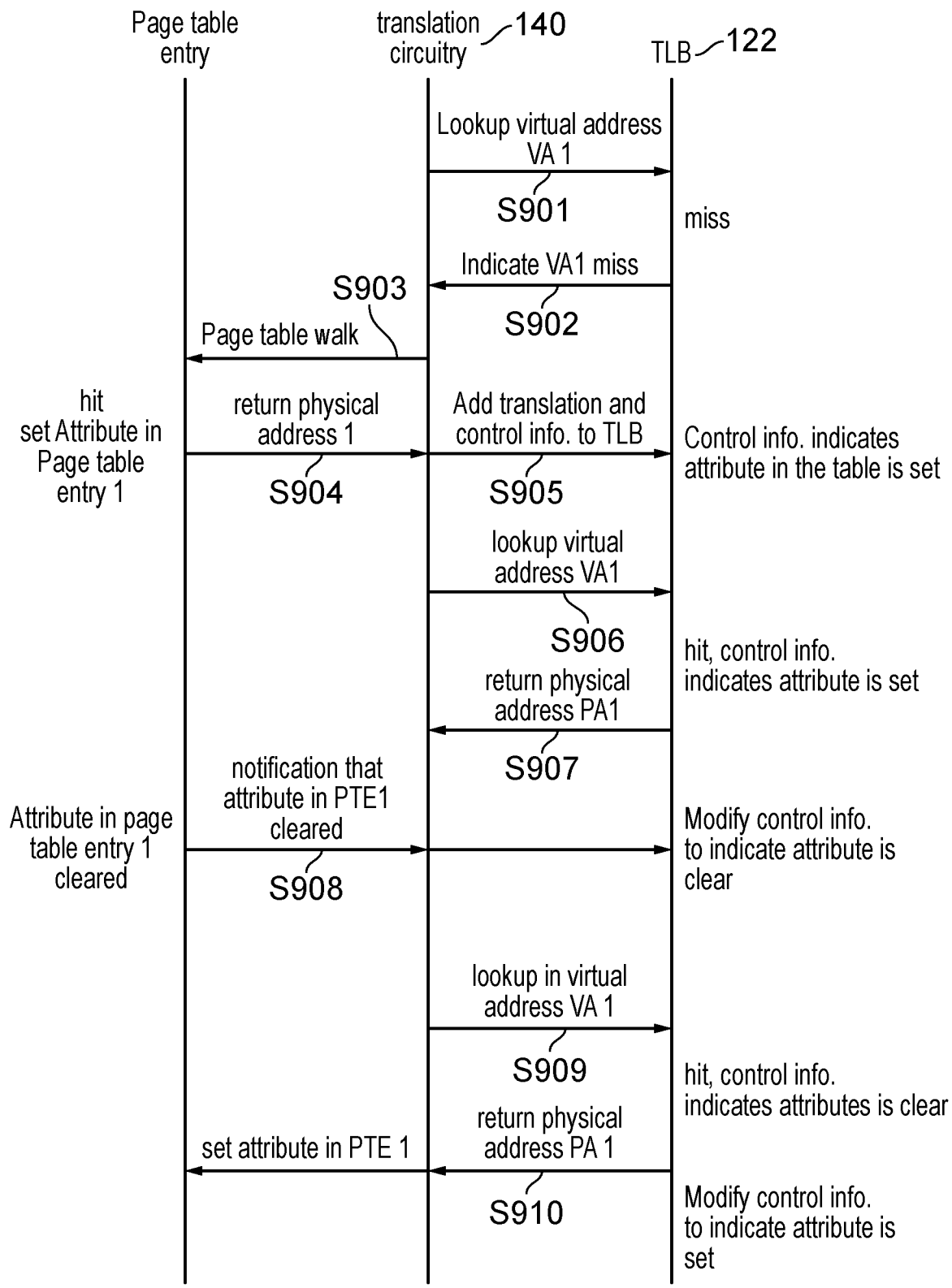
Figure 9:
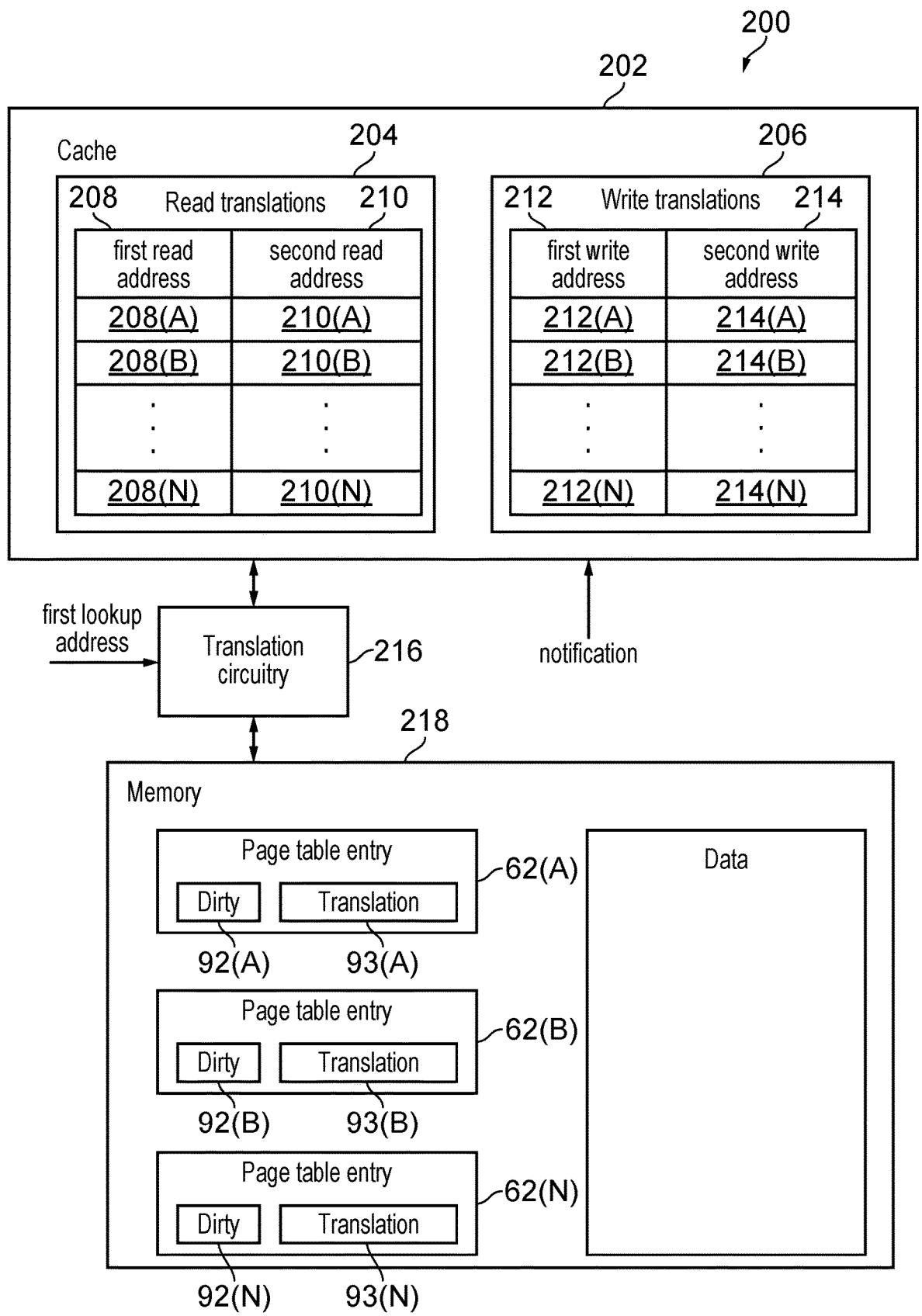
Figure 10:
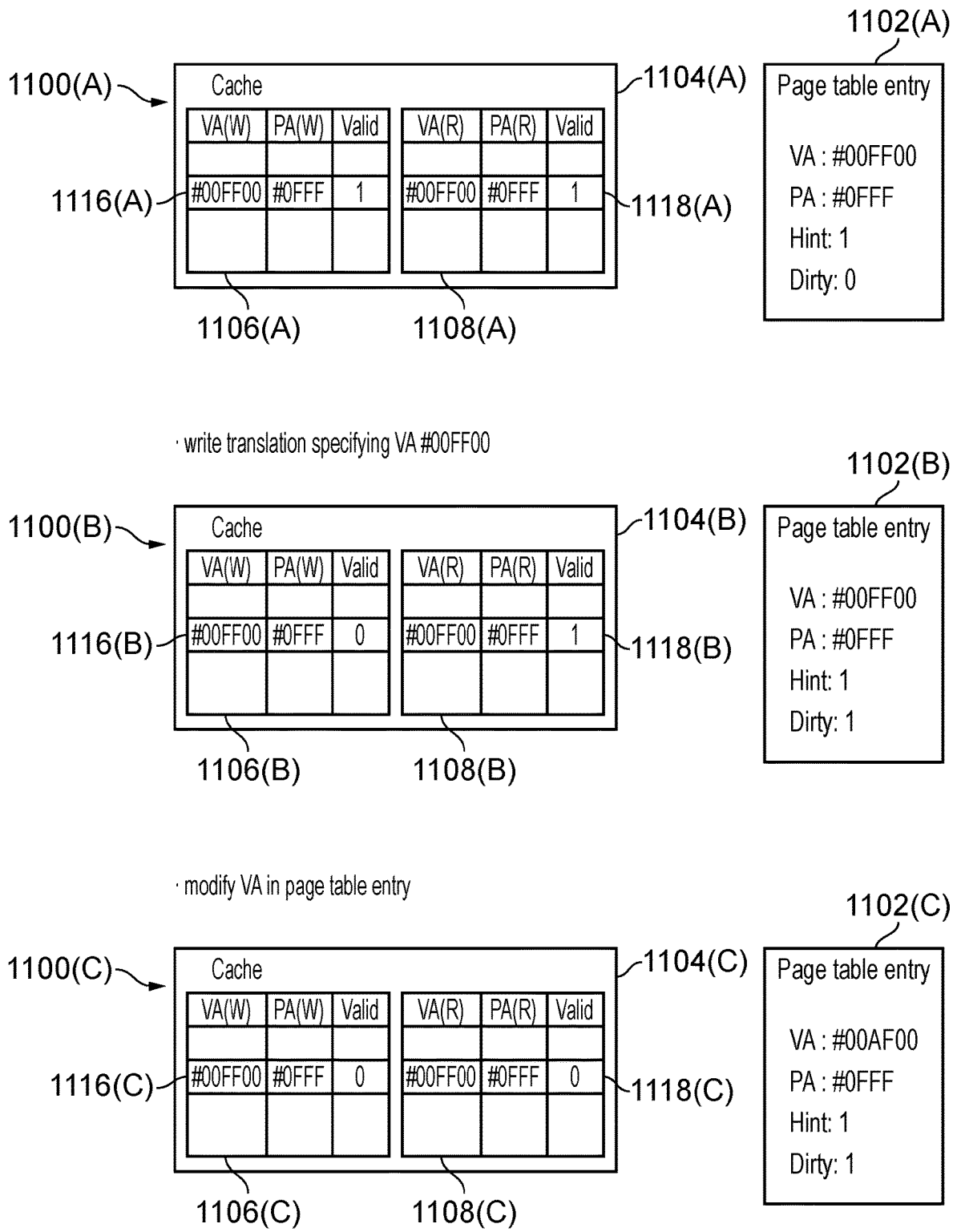
Figure 11:
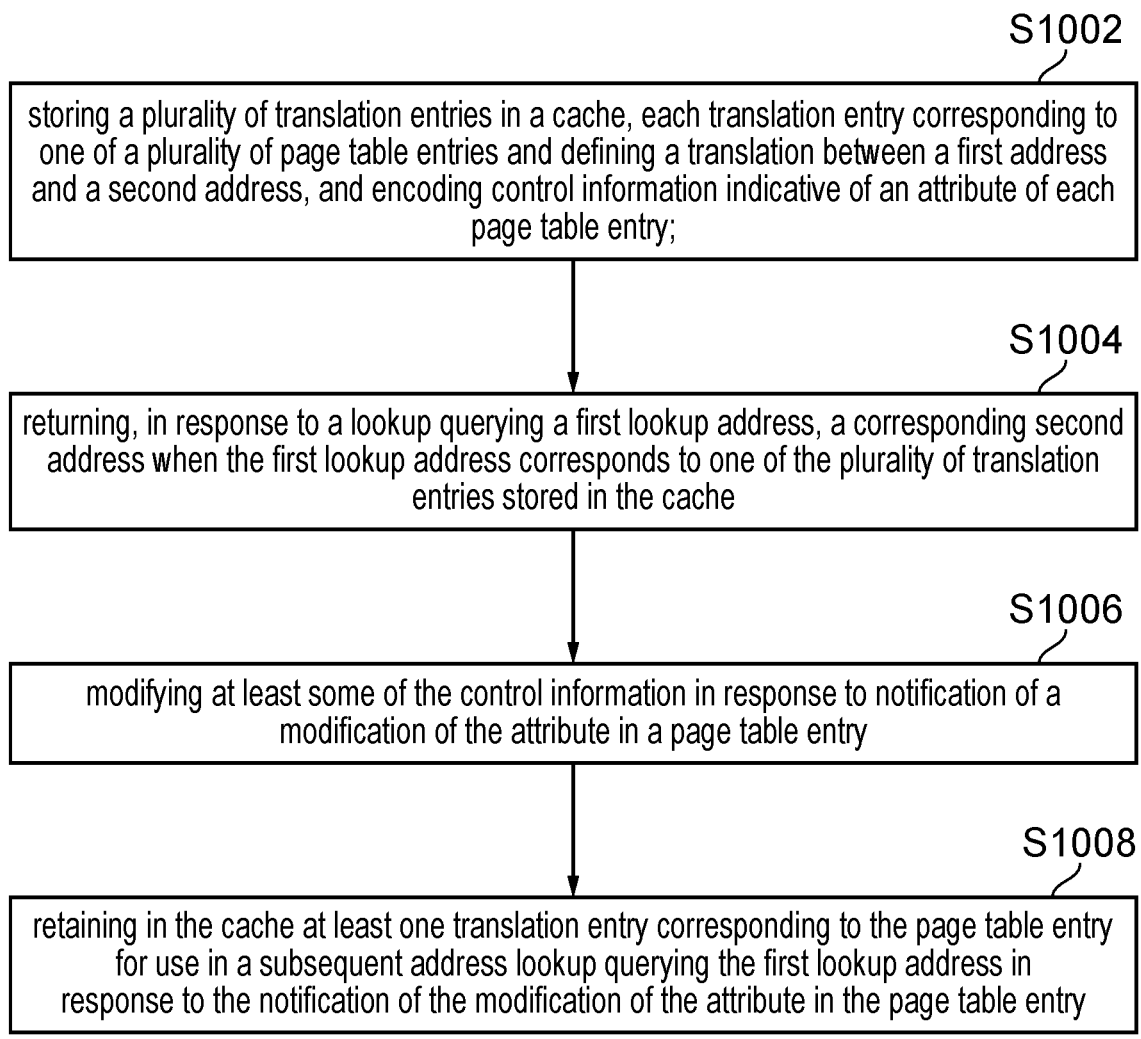

The present techniques will be described further, by way of example only, with reference to embodiments thereof as illustrated in the accompanying drawings, in which:
  FIG. 1 schematically illustrates a data processing apparatus which may embody various examples of the present techniques;
  FIG. 2a schematically illustrates details of a data processing apparatus which may embody various examples of the present techniques;
  FIG. 2b schematically illustrates details of a data processing apparatus which may embody various examples of the present techniques;
  FIG. 3 schematically illustrates details of a data processing apparatus which may embody various examples of the present techniques;
  FIG. 4 schematically illustrates details of a data processing apparatus which may embody various examples of the present techniques;
  FIG. 5 schematically illustrates details of a data processing apparatus which may embody various examples of the present techniques;
  FIG. 6 schematically illustrates a sequence of steps carried out by decode circuitry which may embody various examples of the present techniques;
  FIG. 7 schematically illustrates a sequence of steps carried out by the translation lookaside buffer which may embody various examples of the present techniques;
  FIG. 8 schematically illustrates a sequence of steps carried out with respect to a page table entry, translation circuitry and a translation lookaside buffer which may embody various examples of the present techniques;
  FIG. 9 schematically illustrates a data processing apparatus which may embody various examples of the present techniques;
  FIG. 10 schematically illustrates a data processing apparatus which may embody various examples of the present techniques; and
  FIG. 11 schematically illustrates a sequence of steps carried out which may embody various examples of the present techniques.

At least some embodiments provide a data processing apparatus comprising: a cache to store a plurality of translation entries, each translation entry corresponding to one of a plurality of page table entries and defining a translation between a first address and a second address, and to encode control information indicative of an attribute of each page table entry; and translation circuitry to, in response to a lookup querying a first lookup address, return a corresponding second address when the first lookup address corresponds to one of the plurality of translation entries stored in the cache, wherein in response to notification of a modification of the attribute in a page table entry: at least some of the control information is modified; and at least one translation entry corresponding to the page table entry is retained in the cache for use in a subsequent address lookup querying the first lookup address.

The data processing apparatus is provided with a cache to store translation entries. Each translation entry is associated with a corresponding page table entry and defines a translation between a first address and a second address. The cached translation entries are used by the translation circuitry when translating from a first address to a second address. If there is no translation entry corresponding to the first lookup in the cache then the corresponding second address may be determined using, for example, a page table walk. Such page table walks can be time consuming and, as a result, it is often beneficial to minimise the number of times a cache miss occurs. In order to ensure that the translation entries stored in the cache are consistent with the page table entries it was previously necessary to invalidate translation entries in the cache where such translation entries are associated with modified page table entries. Hence, when a subsequent lookup of the first lookup address is made, a cache miss would occur resulting in a time delay while a page walk occurred. The inventors of the present techniques have realised that not all modifications to a page table entry will cause one or more of the translation entries corresponding to the page table entry to be invalid. For instance, a page table entry might contain a number of attributes in addition to the translation information. For modifications that do not cause one or more of the translation entries to be invalid (e.g. modifying one of the attributes), the data processing apparatus would unnecessarily invalidate the translation entries. The data processing apparatus of the present techniques is responsive to a notification (this could be an internal notification from the cache or a notification generated elsewhere in the data processing apparatus) indicating that an attribute of a page table entry is modified, to modify at least some control information. However, one or more of the translation entries associated with the page table entry are retained in the cache for use in response to a subsequent lookup querying the first lookup address. In this way valid translation entries remain in the cache and the data processing apparatus can beneficially use these translation entries for future lookups. The control information encoded in the cache can take various forms as will be further discussed below. In some embodiments the control information is encoded as a flag or set of bits associated with the translation entries, whilst in other embodiments the encoding of the control information is the presence of an entry corresponding to a particular first address or second address.

The attribute can be defined in various ways. In at least some embodiments the attribute is a hint as to whether the page table entry has been accessed, and modifying the at least some of the control information comprises modifying translation entry specific control information associated with translation entries in the cache corresponding to the page table entry. In other embodiments, the attribute could be, for example, a dirty flag/bit indicating that the data indicated in the page table entry has been modified. It would be readily apparent to the skilled person that the attribute could be any value in the page table entry that can be modified whilst retaining the translation information already present in the page table entry. The hint indicates whether the page table has been accessed or not and can be variously provided. For example, the hint could be a single Boolean value that is set to a logical 1 to indicate that the page table entry has been accessed and that is set to a logical 0 to indicate that the page table entry has not been accessed. Alternatively, a logical 0 could be used to indicate that the page table entry has been accessed and a logical 1 could be used to indicate that the page table entry has not been accessed. The entry specific control information can be variously provided and comprises plural subsets of information, each of which is specific to one of the translation entries and can be used to determine information specific to that entry.

In at least some embodiments the first address is a virtual address in a virtual address space, the second address is a physical address in a physical address space, the first lookup address is a virtual lookup address in the virtual address space. In this way the cache provides translation information that allows a virtual address used by data processing circuitry to be converted to a physical address used by a memory hierarchy. Such a translation enables fewer address bits to be used in the virtual address space than in the physical address space. In other embodiments, the translation might involve intermediate addresses rather than either physical or virtual addresses where address translation might occur in multiple stages, for instance.

In at least some embodiments the modification of the attribute corresponds to setting the attribute of the page table entry to a first value and the modification of the at least some of the control information corresponds to modifying the at least some of the control information to indicate that the attribute of the page table entry has been set to the first value. For example, in some embodiments, the attribute and at least some of the control information match. Alternatively, the control information could comprise information indicative of the attribute or a subset of the bits defining the attribute. In embodiments where the control information is translation entry specific control information and the attribute is a hint as to whether the page table entry has been accessed, the entry specific control information could comprise a single bit that takes the first value when the hint takes the first value to indicate that the page table entry has been accessed, and that takes a logical inverse of the first value when the hint does not take the first value and, hence, indicates that the page table entry has not been accessed. The first value is not limited and could be a Boolean value represented by a single bit with a logical 1 or a logical 0 value. Alternatively, the first value could be any known sequence of bits that are used by the data processing system to indicate the setting of the attribute.

In at least some embodiments the data processing apparatus is further adapted to, in response to the subsequent address lookup: set the attribute of the page table entry to a second value; and modify the at least some of the control information to indicate that the attribute of the page table entry has been set to the second value. The attribute (and therefore the control information) thereby indicate whether the page table entry has been accessed. As previously discussed, the attribute of the page table entry and the control information do not have to be represented by the same values and, as discussed, can be variously represented. The second value is not particularly limited and could be any value that is different to the first value and is not necessarily the logical inverse of the first value.

In at least some embodiments the data processing apparatus is further adapted to, in response to the subsequent address lookup, set the attribute of the page table entry in parallel to performing a data transaction based on a corresponding subsequent second address generated from the subsequent address lookup. By using the translation entry that has been retained in the cache it is possible to perform the data transaction, based on the corresponding subsequent second address (the translated address), without first performing a page table lookup to determine the corresponding subsequent second address. In addition, a transaction to set the attribute in the page table entry can be performed in parallel to the data transaction. This results in the page table entry being updated without having to wait for the data transaction to complete.

In at least some embodiments the data processing apparatus further comprises control circuitry to perform a monitoring procedure to, in response to the attribute being set to the second value, set the attribute to the first value. In this way the attribute is indicative as to whether the page table entry and the corresponding translation entry in the cache have been accessed since the monitoring procedure was initiated.

In at least some embodiments the data processing apparatus further comprises storage circuitry, wherein the control circuitry is further adapted to, when performing the monitoring procedure, record, in the storage circuitry, whether the attribute has been set to the second value. In this way the storage circuitry comprises information indicative as to whether a page table entry, and hence, a particular translation entry stored in the cache, has been accessed since the monitoring procedure was initiated. By initiating a monitoring procedure relating to set the attribute in all page table entries with corresponding translation entries stored in the cache, the storage circuitry stores data that indicates which translation entries in the cache have been used since the monitoring procedure was initiated, and which ones have not. In addition, the storage circuitry makes it possible to store such data over a period of time.

In at least some embodiments the control circuitry is adapted to periodically initiate the monitoring procedure after at least one of: a predetermined time has passed; and a maintenance activity has occurred. For example, in some embodiments the control circuitry is adapted to periodically initiate the monitoring procedure in response to at least one of: a walltime indicative of an actual time (for example, measured in seconds, or any other unit of time) at which the monitoring procedure should take place; a predetermined number of clock cycles; a predetermined number of lookups in the cache; a context switch; completion of network activity; a memory reclaim event; and a change of a power state. By starting the monitoring procedure, it is possible to determine usage of the page table entries in response to such events where the behaviour of the system could dramatically change. For example, by initiating the monitoring procedure, e.g., once every 10 seconds, it can be determined whether a page table entry is accessed within each 10 second window. Hence an access frequency can be determined. For example, if the page table entry was accessed on 3 out of 10 cycles of the monitoring procedure, it can be determined that the page table entry is accessed 3 times per 100 seconds. In this way the data processing apparatus can store information indicative of which translation entries in the cache are used at a specific frequency and which translation entries in the cache need to be maintained once a maintenance activity has occurred.

In at least some embodiments the data processing apparatus further comprises decode circuitry to, responsive to an attribute modification instruction, generate the notification of the modification of the attribute in the page table entry. Hence, when an attribute of the page table entry is modified, the decode circuitry, in addition to generating control signals that cause the modification of the attribute, generates a notification that the attribute in the page table entry has been modified. As discussed, the data processing apparatus is responsive to the notification of the modification to the attribute in a page table entry to modify at least some of the control information and to retain translation entries corresponding to the page table entry for use in a subsequent address lookup querying a corresponding first lookup address.

In at least some embodiments the attribute modification instruction is an attribute invalidation instruction. The attribute invalidation instruction is an instruction that invalidates the control information. Hence, when the data processing apparatus attempts to read the cache to determine the control information, it will be determined that the control information is invalid and that the data processing apparatus needs to perform further processing (e.g. a page table walk) to determine the control information from the page table entry.

In at least some embodiments the cache is a translation lookaside buffer. The translation lookaside buffer provides translations between virtual addresses used in a virtual address space used by data processing circuitry and physical addresses used in a physical address space used by a memory hierarchy.

In at least some embodiments, in response to notification of a modification of a different attribute in the page table entry, the translation entry corresponding to the page table entry is invalidated. As discussed, there are some attributes of the page table entry that may be modified without rendering the corresponding translation entry in the cache invalid. However, there are other attributes (e.g. the above-mentioned "different attribute") of the page table entry that, when modified, would render the translation entry in the cache invalid. By providing a data processing apparatus that is also responsive to the notification of the modification of the different attribute the translation entries in the cache can be retained where possible and otherwise invalidated.

In at least some embodiments the notification of the modification of the attribute in the page table entry and the notification of the modification of the different attribute in the page table entry are provided by different instructions. In alternative embodiments the notification of the modification of the attribute in the page table entry and the notification of the modification of the different attribute in the page table entry are provided by the same instruction with a parameter specifying whether the attribute is to be modified or whether the different attribute is to be modified. In this way, the decode circuitry is set up to respond to the different instructions or to the same instruction with a parameter specifying whether the attribute or the different attribute is to be modified, by providing notifications to the data processing apparatus indicating whether it is the control information that needs to be modified or whether the translation entries need to be invalidated.

In at least some embodiments the different attribute is one of: first address information; second address information; security information; and status information (including access information). It would be readily apparent to the skilled person that the different attribute can be any attribute for which it would be beneficial for the corresponding translation entries in the cache to be invalidated. For example, it may be beneficial to invalidate the translation entries for reasons of data consistency, data security, or system reliability.

In at least some embodiments a translation entry defines one of: a read translation to be used for read accesses between a first read address and a second read address; and a write translation to be used for write accesses between a first write address and a second write address, and wherein the control information is encoded by presence of a valid write translation. In such embodiments the cache stores read translations and write translation separately. The presence of a read translation means that a read transaction specifying a first read address corresponding to the read translation will result in a cache hit and the corresponding second read address will be provided. Similarly, the presence of a write translation means that a write transaction specifying a first write address corresponding to the write translation will result in a cache hit and the corresponding second write address will be provided. In some cases both a read translation specifying a first read address corresponding to a particular address, and a write translation specifying a first write address corresponding to the particular address will be provided. Hence, read and write access to the address will both result in a cache hit. In other cases only a read translation (and no corresponding write translation) with a first read address corresponding to the particular address may be provided. In this case, read access would result in a cache hit and a write access would not result in a hit in the cache. Similarly, in other cases only a write translation (and no corresponding read translation) with a first write address corresponding to the particular address may be provided. In this case a write access would result in a cache hit and a read access would not result in a hit in the cache. In such embodiments the control information is encoded by the presence of a valid write translation. In other words, for a read translation with a first read address corresponding to a particular first address the control information is the presence of a valid write translation with a first write address corresponding to the particular address. As such the modification of the control information corresponds to the invalidation of the write translation. In this way, an attribute modification may necessarily result in the invalidation of the write translation. However, if the attribute modification were such that a read transaction was still valid then the read translation may be maintained in the cache and used in a subsequent transaction.

In at least some embodiments the attribute is a modification flag indicative that data indicated by the page table entry has been modified, and the modification of the at least some of the control information corresponds to invalidating a corresponding write translation while retaining a corresponding read translation. In such embodiments the operating system requires strict ordering on the updating of the modification flag (e.g. dirty flag) with respect to further data transactions relating to the data indicated in the page table entry. A set modification flag indicates that data indicated in the page table entry (i.e. the data pointed to by the second/physical address of the page table entry) has been modified, whilst a clear modification flag indicates that data indicated in the page table entry has not been modified (it would be readily apparent to the skilled person that the set and clear status of the flag can be interchanged such that clear indicates that data indicated in the page table entry has been modified and set indicates that data indicated in the page table entry has not been modified). When a processor writes to the data indicated in the page table, that write should not be visible to any processors until the modification flag is set. In this way a first processor writing to the data indicated in the page table can be confident that the data is not overwritten by a second processor without knowledge of the first processor. In order to ensure this ordering, when the notification of the modification of the attribute is received by the cache, the translation is invalidated in the cache. The inventors have realised that, instead of invalidating both the read and the write translations, performance can be improved by retaining the read translation in the cache because such ordering constraints are not required on read translations and only invalidating the write translation. In this way, the cache is able to provide translations for read accesses without directly from the cache without the need to lookup the required translation in the page table entry.

In at least some embodiments the translation circuitry is adapted to: when the lookup corresponds to a read access, return the corresponding second read address and initiate a read transaction based on the corresponding second read address independently of the control information; when the lookup corresponds to a write access and the control information encodes the presence of a corresponding valid write translation, return a corresponding second write address, and initiate a write transaction based on the corresponding second write address. In such embodiments, when the lookup corresponds to a write access and the control information encodes the absence of a corresponding valid write translation, no corresponding second write address is returned by the translation circuitry and the data processing apparatus is required to lookup the translation in the page table entry. However, for the read access, there is no such requirement on the control information and the translation circuitry will return the corresponding second read address independent of whether there is a valid write translation or an invalid write translation and hence, a page table walk to determine the corresponding second read address can be avoided.

FIG. 1 schematically illustrates an example of a data processing apparatus 2 that includes a number of stages including a fetch stage 6, a decode stage 10, a rename stage 12, an issue stage 16, an execute stage 14 and a write back stage 20. Instructions move through the pipeline from stage to stage and some instructions may be at one stage at the pipeline while other instructions are pending at another stage. It will be appreciated that this is just an example of a possible pipeline configuration and other examples may have different stage or combinations of stages as required.

The fetch stage 6 fetches instructions, e.g. from an instruction cache. A branch predictor 4 may be provided for predicting the outcomes of branch instructions. The fetched instructions are passed to a decode stage 10 which decodes the instructions to generate decoded instructions which may provide control signals for triggering the execute stage 18 to perform the corresponding processing operation. For some instructions fetched by the fetch stage 6, the decode stage 8 may map the instruction to more than one decoded instruction so that the "instructions" seen by later stages of the pipeline may be in a different form to the instructions fetched from the cache 8. The decoded instructions are passed to a register rename stage 12 for mapping architectural register specifiers specified by the instructions to physical register specifiers identifying corresponding physical registers 14 to be accessed in response to the instructions. The issue stage 16 queues instructions awaiting issue for execution. The execute stage 18 executes instructions which have been issued by the issue stage 16, to carry out various data processing operations in response to the instructions, such as arithmetic or logical operations, or load/store operations to a data cache 30 or a further level cache 32 or memory 34. The execute unit 18 may have a number of execution units 22, 24, 21, 25, including a load store unit 26 for queuing a number of pending load/store operations. The write back stage 20 writes results of instructions executed by the execute stage 18 to the physical register file 14 which includes predicate registers 44 and condition status registers 42.

The pipeline also has a memory management unit (MMU) 35 comprising a translation lookaside buffer (TLB) 36 which includes a number of TLB entries for translating virtual addresses specified by instructions to physical addresses identifying data within a cache or memory. Each entry may correspond to a given page of virtual addresses (first addresses) and specify how to translate those addresses into corresponding physical addresses (second addresses). When a load/store operation is received by the load/store unit 26, the load/store unit 26 may pass the corresponding virtual address to the TLB 36. If the TLB 36 includes an entry for the corresponding page, it may return the corresponding physical address. If the TLB 36 does not store an entry for the page including the requested virtual address, it can fetch the TLB entry from a further level TLB or page table entries in memory.

FIG. 2a schematically illustrates further details of a data processing apparatus 90 according to some embodiments. The data processing apparatus 90 comprises a cache 80, translation circuitry 58 and memory 60. The cache 80 comprises a plurality of translation entries 88. Each entry of the plurality of translation entries 86 comprises a first address 82 (for example a virtual address), a second address 84 (for example a physical address) and translation entry specific control information 86. Each of the translation entries 88 in the cache 80 has a corresponding page table entry 62 in the memory 60 which defines the same translation 93 as the translation entry. Specifically, the first translation entry of the translation entries 88 defines first address 82(A), second address 84(A), and control information 86(A). The first translation entry may have corresponding page table entry 62(A) which defines the same translation 93(A) as the translation entry to which it corresponds. In this example, translation 93(A) of page table entry 62(A) will define first address 82(A) and second address 84(A). The page table entries 62 in the memory 60 further comprise, as the attribute, a hint 92 as to whether the page table entry has been accessed.

The data processing apparatus 90 further comprises translation circuitry 58 which is responsive to a lookup querying a first lookup address to return a corresponding second address when the first lookup address corresponds to a first address 82 in the plurality of translation entries 88. For example, if the first lookup address corresponded to first address 82(B) then the translation circuitry would determine a cache hit and the corresponding second address 84(B) would be returned to be used in a data transaction in the memory 60.

The data processing apparatus 90 is responsive to notification of the modification of the hint 92 to modify the entry specific control information 86 corresponding to the translation entry associated with the particular page table entry. For example, if page table entry 62(A) with hint attribute 92(A) corresponds to the translation entry with first address 82(A), second address 84(A) and control information 86(A) then, when the hint attribute is modified to indicate that the page table entry has been accessed, a notification is provided that causes the translation entry specific control information 86(A) to be modified to indicate that the corresponding page table entry 62(A) has been accessed. As the translation 93(A) in the page table entry is not modified by the setting or clearing of the access flag, the translation entry in the cache providing a translation from the first address 82(A) to second address 84(A) remains valid. Hence, this translation entry is retained in the cache for use in subsequent lookups specifying the first address 82(A). In some embodiments the hint 92 may be a single bit that takes a first value when the page table entry 62 has not been recently accessed and that takes a second value when the page table entry 62 has been recently accessed. In such embodiments the corresponding translation entry specific control information 86 may be a single bit indicative of the value of the hint attribute 92.

FIG. 2b schematically illustrates further details of a data processing apparatus 98 according to some embodiments. The data processing apparatus 98 comprises a number of features that have already been described in relation to FIG. 2a. Hence, the description will relate to the features that differ from those already described. In particular, the data processing apparatus comprises a cache 91, translation circuitry 58 and memory 60. The memory 60 comprises a number of page table entries 62 each defining a translation 93 from a first address (virtual address) to a second address (physical address). The page table entries 62 comprise a number of attributes including dirty bit 94 which indicates that data 74 referred to in the page table entry has been modified.

The cache 91 comprises a number of translation entries 99. Each translation entry corresponds to a page table entry 62. In particular the translation entries comprise a cached copy of the translation 93 in the page table entry 62 from a first address 95 (virtual address) to a second address 97 (physical address) that is defined in the page table entry. In addition the translation entries 99 are each associated with translation entry specific control information 97. The translation entry specific control information 97 is modified in response to a modification of the dirty bit in the corresponding page table entry. For example if data indicated in page table entry 62(A) is modified then dirty bit 94(A) is set to indicate that the data has been modified. When the dirty bit is modified the data processing apparatus 98 sends a notification to the cache 91 to cause modification of the translation entry specific control information that corresponds to the page table entry. In the illustrated example, it is assumed that the first translation entry with first address 95(A), second address 96(A) and control information 97(A) corresponds to page table entry 62(A). In other words the translation defined by the first address 95(A) and the second address 96(A) is a cached copy of the translation 93(A) defined in page table entry 62(A). Hence, when dirty bit 94(A) is modified a notification is sent to the cache and translation entry specific control information 97(A) is modified to indicate that the dirty bit has been modified.

In response to a transaction specifying a first address the translation circuitry 58 performs a lookup in the TLB cache 91 and, when the first address hits in the cache, the second address and control information is returned. In this way the data processing apparatus is able to determine whether the data 74 stored at the physical address has been modified and to take appropriate action. For example, if the control information indicates that the data has been modified and the transaction is a write transaction, the data processing apparatus 98 may choose to abort the write transaction to maintain data integrity.

FIG. 3 schematically illustrates the modification of control information and entries in the cache 300 in response to the modification of a page table entry 302. Subfigure 300(A) shows a cache 306(A) comprising a plurality of translation entries. Each translation entry comprises a virtual address (VA), a physical address (PA), control information (ctrl) and a valid bit. Each of the translation entries in the cache 306(A) corresponds to a page table entry. In particular, the translation entry is a cached copy of a translation between a virtual and a physical address as defined in a page table entry. For example, translation entry 304(A) corresponds to the page table entry 302(A). The translation entry 304(A) comprises virtual address #00FF00, physical address #0FFF, control information 1 and valid bit 1. This information indicates that virtual address #00FF00 corresponds to physical address #0FFF, the control information determines that the hint attribute of page table entry 302(A) is set and the valid bit determines that the entry is valid. It would be understood by the skilled person that the example virtual and physical addresses are purely used for the purpose of example and any format or length of virtual or physical address could be used. Similarly, any additional status bits could be added to the cached entry. The page table entry 302(A) defines the virtual address and physical address that are copied in the cached entry and a number of additional bits of information. In the illustrated example, the page table entry also comprises a hint flag which takes a value of 1 to indicate that the page table entry has recently been accessed and takes a value of 0 to indicate that the page table entry has not recently been accessed; and a dirty bit that takes a value of 1 to indicate that data indicated in the page table has been modified and a value of 0 to indicate that data indicated in the page table entry has not been modified. It would be readily apparent to the skilled person that these values could be interpreted as having the opposite meaning depending on the particular implementation.

Subfigure 300(B) schematically illustrates the result of an attribute invalidation instruction acting on the page table entry 302(A) and the cache 306(A). In particular, the attribute invalidation instruction modifies the hint flag of page table entry 302(A) to be set to zero resulting in the page table entry 302(B). In addition, and as discussed above, a notification is sent to indicate that the hint is modified. As a result the data processing apparatus modifies the control information in the cache to indicate that the hint attribute has been modified. The resulting translation entry 304(B) is illustrated in cache 306(B). In particular, the virtual address and the physical address in 306(B) have not been modified with respect to those in translation entry 304(A). In this way the translation information itself is retained in cache 306(B) and is valid (as indicated by the valid bit in translation entry 304(B). However, the control information of 0 indicates that the hint value has been set to zero (cleared) in page table entry 302(B). The data processing apparatus can therefore determine that, when a transaction based on the translation entry 304(B) is initiated, a further transaction is required to set the hint flag in page table entry 302(B). In this way, the page table entry 302(B) accurately indicates whether an access has been made—either via the page table entry itself or via the cached version of the page table entry in the TLB. As a consequence of the transaction updating the hint flag in the page table entry 302(B) (e.g. to 1), the control information in the entry 304(B) of the TLB 306(B) will also be updated (e.g. to 1).

Subfigure 300(C) schematically illustrates the cache 306 (C) and the page table entry 302(C) as a result of an instruction that modifies the virtual address in the page table entry 302(C). In particular, the virtual address of page table entry 302(B) is modified from #00FF00 to #00AF00, as illustrated in page table entry 302(C). As a result, the translation entry 304(C) in cache 306(C) no longer accurately represents the page table entry. Hence, the translation entry 304(C) is marked as invalid. In the illustrated embodiment this is achieved by clearing the valid bit. However, it would be appreciated by the skilled person that any method of invalidating the translation could be used.

Hence, the described data processing apparatus is able to retain translation information in the cache when the corresponding page table entry is modified in such a way that the translation defined in the page table entry is not modified. As a result, lookups, specifying virtual address #00FF00, can be translated to physical address #0FFF so long as the translation in the corresponding page table entry is consistent with the cached entry.

FIG. 4 schematically illustrates further details of a data processing apparatus 100 according to some embodiments. The data processing apparatus comprises cache 102, translation circuitry 104, memory 106 and control circuitry 108. The cache 102 comprises a plurality of translation entries and control information as discussed above. The control circuitry 108 may be variously provided, however the control circuitry 108 performs the function of initiating a monitoring procedure. The monitoring procedure comprises the steps of periodically determining if the attributes 112 of the page table entries 110 indicate that a page table entry 110 has been recently accessed and, if so, modifying the attribute 112 such that the attribute 112 indicates that the corresponding page table entry 110 has not recently been accessed. By repeating this procedure, the control circuitry is able to determine if a page table entry 110 has been accessed since the control circuitry last modified (e.g. reset) the attribute 112 of the page table entry 110. The attribute 112 therefore constitutes an indication or hint as to whether the page table entry 110 has been recently accessed, where the term "recently accessed" refers to an access in a period since the control circuitry 108 last modified the attribute 112 to indicate that the page table entry 110 has not been recently accessed. In addition to modification of the attribute, a notification is sent to the cache 102 such that the control information can be modified to indicate that the attribute 112 of the page table entry 112 has been modified.

FIG. 5 schematically illustrates further details of a data processing apparatus 120 adapted to perform a monitoring procedure according to some embodiments. The data processing apparatus 120 comprises a translation lookaside buffer (TLB) 122, translation circuitry 140, decode circuitry 142, control circuitry 144, storage circuitry 146, and memory 148. The TLB 122 comprises a plurality of translation entries 130, each of the translation entries 130 comprises a virtual address 124 (VA), a physical address 126 (PA) and control information 128. The translation circuitry 140 receives a virtual address comprising most significant bits (MSB) 132 and least significant bits (LSB) 134.

The translation circuitry passes the most significant bits 132 to the TLB to perform a translation. If the most significant bits 132 of the virtual address correspond to an entry in the TLB then the corresponding most significant bits 136 of a physical address and the corresponding control information 138 are output from the TLB to the translation circuitry. If the control information 138 corresponding to the most significant bits of the physical address 136 indicate that the data associated with the physical address has not yet been accessed then the data processing apparatus 120 causes the TLB to modify the corresponding control information 128 to indicate that the data associated with the physical address has now been accessed. The translation circuitry 140 generates the physical address from the most significant bits 136 of the physical address and the least significant bits 134 of the virtual address. The physical address is then used for a data transaction in the memory 148. The control information 138 is passed from the translation circuitry to the control circuitry 144 which may record, in the storage circuitry 146, that the data associated with the physical address has now been accessed. In addition, the modification of the control information 128 causes a second transaction to be performed to modify the attribute in the page table entry to indicate that the data associated with the physical address has now been accessed. In this way, the control information is updated before the attribute is updated.

In addition, the data processing apparatus is also responsive to an attribute invalidation instruction. In particular, decode circuitry 142 is responsive to the attribute invalidation instruction to modify the attribute in a page table stored in the memory 148 to indicate that the data associated with the physical address stored in the page table has not been accessed. The decode circuitry 142 is further responsive to the attribute invalidation instruction to generate a notification of the modification of the attribute in the page table entry. The notification causes the data processing apparatus to modify the entry specific control information 128 in the TLB 122 to indicate that the data associated with the physical address 126 has not been accessed. In addition, the notification causes the TLB to retain to retain the address translation entry defining the translation between the virtual address 124 and the physical address 126. In some embodiments the attribute and the control information could be updated in parallel, whilst in other embodiments either the attribute or the control information could be updated prior to the other. The decode circuitry 142 may be further responsive to different instructions that are entry invalidating instructions which cause the page table entries to be modified in such a way that the translation information 130 in the TLB 122 is invalid. The decode circuitry 142 is responsive to the entry invalidating instructions to generate a notification of the modification of the different attribute of the page table entry and, in response to the notification of the modification of the different attribute of the page table entry, the corresponding translation entry in the TLB 122 is invalidated.

The control circuitry 144 can perform a monitoring procedure to determine which entries in the TLB 122 correspond to frequently accessed data. The control circuitry 144 periodically initiates the monitoring procedure after at least one of a predetermined time or a maintenance activity. The monitoring procedure involves clearing hint attributes of one or a plurality of the page table entries to indicate that they have not been accessed. The control circuitry 144 then monitors to determine whether the page table entries are accessed and, if so, records the access in the storage circuitry. By periodically running the monitoring procedure the data stored in the storage circuitry can be used to build a picture of which data is being frequently accessed.

FIG. 6 schematically illustrates a sequence of steps carried out by the decode circuitry 142 in some embodiments. Flow starts at step S602 where a next instruction is received. Flow then proceeds to step S604 where it is determined if the instruction is an attribute invalidation instruction. If yes then flow proceeds to step S606, if no, then flow proceeds to step S616. At step S606 it is determined whether the attribute is set in the page table entry. If no then flow returns to step S602, if yes, then flow proceeds to step S608 where the attribute in the page table entry is cleared. Flow then proceeds to step S610 where it is determined if there is a corresponding entry in the TLB 122. If no then flow returns to step S602, if yes, then flow proceeds to step S612 where the control information in the TLB 122 corresponding to the page table entry is modified. Flow then proceeds to step S614 where the translation entry corresponding to the modified page table entry is retained in the TLB 122 for use in a subsequent lookup. Flow then returns to step S602.

If the result of step S604 is no, then flow proceeds to step S616 where it is determined if the instruction is an entry invalidating instruction that will modify the page table entry in such a way that a cached copy of the translation in the TLB 122 would be rendered invalid (for example, by modifying the translation itself such that the cached translation entry is inconsistent with the page table entry). If no then flow returns to step S602. If yes, then flow proceeds to step S618 where an attribute of the page table entry, different to the attribute that is modified in response to the attribute invalidating instruction, is modified. For instance, the different attribute could be the translation itself. Flow then proceeds to step S620 where it is determined if there is a corresponding entry in the TLB. If no, then flow returns to step S602. If yes, then flow proceeds to step S622 where the TLB entry is invalidated before flow returns to step S602.

FIG. 7 schematically illustrates a sequence of steps carried out by the translation circuitry 140 Flow begins at step S702 where the translation circuitry 140 performs a lookup in the TLB 122 using an incoming virtual address (VA). Flow then proceeds to step S704 where it is determined whether or not a physical address and control information are returned by the TLB 122, indicating that the virtual address has hit in the TLB 122. If yes, then proceeds to step S708 where it is determined whether the control information indicates that an attribute in the corresponding page table entry is set. If yes, then flow proceeds to step S710. If no then flow proceeds to step S712, where a transaction is initiated to set the attribute in the page table entry. Flow then proceeds to step S714 where the translation circuitry 140 instructs the TLB 122 to set the control information to indicate that the access flag is set before flow proceeds to step S710.

If, at step S704, it was determined that the virtual address did not hit, i.e., the virtual address missed, in the TLB 122 then flow proceeds to step S716 where a page table walk is initiated to return a page table entry and a corresponding physical address. Flow then proceeds to step S718 where the attribute in the page table entry is set to indicate that the data associated with the page table entry has been accessed. Flow then proceeds to step S720 where the translation circuitry 140 instructs the TLB 122 to generate a translation entry based on the page table entry. Flow then proceeds to step S722 where the translation circuitry 140 instructs the TLB 122 to set the control information to indicate that the attribute in the corresponding page table entry is set. Flow then proceeds to step S710. At step S710 a transaction, based on the physical address, is initiated before returns to step S702. The transaction initiated in step S710 can be initiated in parallel to the transaction of step S712 (when step S712 is carried out).

FIG. 8 schematically illustrates a sequence of steps carried out with respect to the page table entry, the translation circuitry 140 and the TLB 122. At step S901 the translation circuitry 140 performs a lookup of virtual address VA1 in the TLB 122. In this example, it is assumed that initially there is not a corresponding translation entry in the TLB 122 and, hence, the lookup misses. At step S902, the TLB 122 indicates the miss to the translation circuitry which, at step S903, initiates a page table walk to determine the physical address. At step S904, the physical address corresponding to virtual address VA1 is returned to the translation circuitry 140 and the attribute in the corresponding page table entry is set to indicate that the data associated with the page table entry has been accessed. At step S905, the TLB 122 generates an entry corresponding to the translation between the virtual address VA1 and the physical address. Corresponding control information is set that indicates that the attribute in the page table entry is set. At step S906, another lookup is received by the TLB from the translation circuitry 140. The lookup corresponds to the same virtual address VA1. As a new translation entry in the TLB 122 corresponds to the virtual address VA1, the lookup hits in the TLB and the physical address PA1 corresponding to the virtual address VA1 is returned to the translation circuitry 140.

At step S908 a notification that the attribute in the page table entry has been cleared is received. In response the TLB 122 modifies the control information to indicate that the attribute is clear. In addition, the TLB 122 retains the translation entry providing the translation between the virtual address VA1 and the corresponding physical address PA1. At step S909, in response to a third lookup specifying the virtual address, VA1 is sent from the translation circuitry 140 to the TLB 122. Because the translation entry specifying the translation between the virtual address VA1 and the corresponding physical address PA1 was retained, the lookup hits in the TLB 122 and the physical address PA1 is returned to the translation circuitry 140 at step S910. In addition, the control information in the TLB 122 is modified to indicate that attribute in the page table entry is to be set and the attribute in the page table entry is set.

FIG. 9 schematically illustrates a data processing apparatus 200 according to some to some alternative embodiments to those illustrated in FIGS. 2-3. The data processing apparatus comprises a cache 202, translation circuitry 216 and memory 218. The cache 202 differs to the earlier embodiments in that it comprises read translation entries 204 which define a translation between a first read address 208 (virtual read address) and a corresponding second read address 210 (physical read address). The cache 202 further comprises write translation entries 206 which define a translation between a first write address 212 (virtual write address) and a corresponding second write address 214 (physical write address). It is noted that, for each second address, there may be at least one read translation and at least one write translation defined. Alternatively, some second addresses may only have a corresponding read translation or a corresponding write translation. The cache 202 further comprises control information that is encoded by/in the presence or absence of a write translation corresponding to a read translation. In particular, for a given read translation specifying a first read address 208(A) and a second read address 210(A), the control information can be considered to take a first value when there exists a valid write translation specifying a first write address 212(A) corresponding to a second write address 214(A) if the second read address 210(A) is the second write address 214(A). On the other hand, the control information can be considered to take a second value when there is no valid second write address that corresponds to the second read address 210(A). Hence, the value of the control information is determined through the determination as to whether a given second read address 210 has a corresponding valid second write address 214 that is the same as the second read address. Each of the read translations 204 and the write translations 206 of the cache 202 corresponds to a page table entry 62 comprising translation 93 and dirty bit 92 as described in relation to FIG. 2b.

The translation circuitry 216 is responsive to both read and write accesses to perform lookups in the cache 202. Where an access is a read access the translation circuitry 216 performs a read lookup in the cache 202. When an access is a write access the translation circuitry 216 performs a write lookup in the cache 202. If the lookup hits in the cache 202 then a second address is returned. Whilst the illustrated embodiment makes a distinction between second read address and second write addresses, it should be understood that there is only a single second address in the memory corresponding to a particular data item and the returned second address is the second read address when a read lookup hits in the cache, and the returned second address is the second write address when a write lookup hits in the cache 202.

The cache 202 is responsive to a notification of the modification of the attribute of the page table entry 62 to invalidate the write translation and to retain the read translation. In the illustrated embodiment, the attribute in the page table entry is a dirty flag that is indicative that the data referred to in the page table entry has been modified, for example, in response to a write transaction by a processor. There are strict ordering requirements relating to write transactions. In particular, when a processor writes a given set of data to a physical address, the modification flag must be set before any other write transactions are carried out relating to that physical address. This ensures that the processor performing the write transaction can be sure that a subsequent write transaction by a different processor does not unknowingly overwrite the given data. However, as there are no such ordering requirements for the read translation, there is no requirement for it to be invalidated. Hence, by only invalidating the write translation, the read translation can be used to read data from the second read address defined in the read translation. The invalidation could be through the setting of a particular valid bit associated with the write translation, alternatively a translation could be marked invalid by setting one of the first write address 212 and the second write address 214 to a predetermined value. In some embodiments the attribute is a modification flag that is indicative that data indicated by the page table entry has been modified. In this way, when the data indicated by the page table entry is modified write translations 206 can be invalidated whilst the corresponding read translations 204 can be retained for future lookups.

FIG. 10 schematically illustrates the modification of control information and entries in the cache 1104 in response to the modification of a page table entry 1102 for a data processing apparatus as illustrated in FIG. 9. Subfigure 1100(A) shows a cache 1104(A) comprising a plurality of read translation entries 1106(A) and a plurality of write translation entries 1104(A). Each of the read translation entries 1108(A) and the write translation entries 1108(B) comprises a virtual address (VA), a physical address (PA), and a valid bit. Each of the translation entries in the cache 1104(A) corresponds to a page table entry. In particular, the illustrated read translation entry 1118(A) and the illustrated write translation entry 1116(A) are cached copies of a translation between a virtual and a physical address as defined in page table entry 1102(A). The illustrated read translation entry 1118(A) and the illustrated write translation entry 1116(A) comprises virtual address #00FF00, physical address #0FFF, and valid bit 1. This information indicates that virtual address #00FF00 corresponds to physical address #0FFF for both the read translation 1118(A) and the write translation 1116(A), and the valid bit determines that the entry is valid. It would be understood by the skilled person that the example virtual and physical addresses are purely used for the purpose of example and any format or length of virtual or physical address could be used. Similarly, any additional status bits could be added to the cached entry. The page table entry 1102(A) defines the virtual address and physical address that are copied in the cached entry and a number of additional bits of information. In the illustrated example, the page table entry also comprises a hint flag which takes a value of 1 to indicate that the page table entry has recently been accessed and takes a value of 0 to indicate that the page table entry has not recently been accessed; and a dirty bit that takes a value of 1 to indicate that data indicated in the page table has been modified and a value of 0 to indicate that data indicated in the page table entry has not been modified. It would be readily apparent to the skilled person that these values could be interpreted as having the opposite meaning depending on the particular implementation. In the illustrated embodiment, the control data is encoded in the cache 1104(A) through the presence of a valid write translation 1116(A).

Subfigure 300(B) schematically illustrates the result of a write transaction specifying virtual address #00FF00. In particular, the write transaction modifies the dirty bit of page table entry 1102(A) to be set to 1 resulting in the page table entry 1102(B). In addition, and as discussed above, a notification is sent to indicate that the data specified in the page table entry has been modified. As a result the data processing apparatus modifies the control information in the cache to indicate that the hint attribute has been modified. Specifically, the write translation entry 1116(B) is invalidated whilst the corresponding read translation entry 1118(B) is retained as a valid read translation. The resulting translation entries 1118(B) and 1116(B) are illustrated in cache 1104(B). The data processing apparatus can therefore determine that, when a write transaction based on the virtual address #00FF00 is looked up in the cache, the data associated with the page table entry 1102(B) is dirty (without having to lookup the corresponding page table entry 1102(B).

Subfigure 1100(C) schematically illustrates the cache 1104(C) and the page table entry 1102(C) as a result of an instruction that modifies the virtual address in the page table entry 1102(C). In particular, the virtual address of page table entry 1102(B) is modified from #00FF00 to #00AF00, as illustrated in page table entry 1102(C). As a result, the read translation entry 1118(C) and the write translation entry 1116(C) in cache 1104(C) no longer accurately represents the page table entry. Hence, the read translation entry 1118(C) is also marked as invalid. In the illustrated embodiment this is achieved by clearing the valid bit. However, it would be appreciated by the skilled person that any method of invalidating the translation could be used.

Hence, the described data processing apparatus is able to retain translation information in the cache when the corresponding page table entry is modified in such a way that the read translation defined in the page table entry remains valid. As a result, read lookups, specifying virtual address #00FF00, can be translated to physical address #0FFF so long as the read translation in the corresponding page table entry is consistent with the cached entry.

FIG. 11 schematically illustrates a sequence of steps carried out in some embodiments. In step S1002, a plurality of translation entries is stored in a cache, each translation entry corresponding to a page table and defining a translation between a first address and a second address, and encoding control information indicative of an attribute of each page table entry. In step S1004, in response to a lookup querying a first lookup address, a corresponding second address is returned when the first lookup address corresponds to one of the plurality of translation entries stored in the cache. At step S1006 at least some of the control information is modified in response to notification of a modification of the attribute in a page table entry. At step S1008 a translation entry corresponding to the page table entry is retained in the cache for use in a subsequent address lookup querying the first lookup address in response to the notification of the modification of the attribute in the page table entry.

In brief overall summary an apparatus and method are provided for storing a plurality of translation entries in a cache, each translation entry corresponding to one of a plurality of page table entries and defining a translation between a first address and a second address, and encoding control information indicative of an attribute of each page table entry; returning, in response to a lookup querying a first lookup address, a corresponding second address when the first lookup address corresponds to one of the plurality of translation entries stored in the cache; modifying at least some of the control information in response to notification of a modification of the attribute in a page table entry; and retaining in the cache at least one translation entry corresponding to the page table entry for use in a subsequent address lookup querying a corresponding first lookup address in response to the notification of the modification of the attribute in the page table entry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
   a cache to store a plurality of translation entries, each translation entry corresponding to one of a plurality of page table entries and defining a translation between a first address and a second address, and to encode control information indicative of an attribute of each page table entry; and
   translation circuitry to, in response to a lookup querying a first lookup address, return a corresponding second address when the first lookup address corresponds to one of the plurality of translation entries stored in the cache,
   wherein the translation circuitry is responsive to notification of a modification of the attribute of a page table entry corresponding to at least one translation entry already present in the cache to:
      modify at least part of the control information associated with the at least one translation entry; and
      retain the at least one translation entry corresponding to the page table entry in the cache for use in a subsequent address lookup querying the first lookup address.

2. The data processing apparatus of claim 1, wherein the attribute is a
   hint as to whether the page table entry has been accessed, and wherein modifying the at least part of the control information comprises modifying translation entry specific control information associated with translation entries in the cache corresponding to the page table entry.

3. The data processing apparatus of claim 1, wherein each first address is a virtual address in a virtual address space, each second address is a physical address in a physical address space, and the first lookup address is a virtual lookup address in the virtual address space.

4. The data processing apparatus of claim 1, wherein the modification of the attribute corresponds to setting the attribute of the page table entry to a first value and the modification of the at least part of the control information corresponds to modifying the at least part of the control information to indicate that the attribute of the page table entry has been set to the first value.

5. The data processing apparatus of claim 4, wherein the data processing apparatus is further adapted to, in response to the subsequent address lookup:
set the attribute of the page table entry to a second value; and
modify the at least part of the control information to indicate that the attribute of the page table entry has been set to the second value.

6. The data processing apparatus of claim 5, wherein the data processing apparatus is further adapted to, in response to the subsequent address lookup, set the attribute of the page table entry in parallel to performing a data transaction based on a corresponding subsequent second address generated from the subsequent address lookup.

7. The data processing apparatus of claim 5, further comprising control circuitry to perform a monitoring procedure to, in response to the attribute being set to the second value, set the attribute to the first value.

8. The data processing apparatus of claim 7, further comprising storage circuitry, wherein the control circuitry is further adapted to, when performing the monitoring procedure, record, in the storage circuitry, whether the attribute has been set to the second value.

9. The data processing apparatus of claim 7, wherein the control circuitry is adapted to periodically initiate the monitoring procedure after at least one of:
a predetermined time has passed; and
a maintenance activity has occurred.

10. The data processing apparatus of claim 7, wherein control circuitry is adapted to periodically initiate the monitoring procedure in response to at least one of:
a walltime
a predetermined number of clock cycles;
a predetermined number of lookups in the cache;
a context switch;
completion of network activity;
a memory reclaim event; and
a change of a power state.

11. The data processing apparatus of claim 1, further comprising decode circuitry to, responsive to an attribute modification instruction, generate the notification of the modification of the attribute in the page table entry.

12. The data processing apparatus of claim 11, wherein the attribute modification instruction is an attribute invalidation instruction.

13. The data processing apparatus of claim 1, wherein the cache is a translation lookaside buffer.

14. The data processing apparatus of claim 1, wherein in response to notification of a modification of a different attribute in the page table entry, the at least one translation entry corresponding to the page table entry is invalidated.

15. The data processing apparatus of claim 14, wherein the notification of the modification of the attribute in the page table entry and the notification of the modification of the different attribute in the page table entry are provided by different instructions.

16. The data processing apparatus of claim 14, wherein the different attribute is one of:
first address information;
second address information;
security information;
and status information.

17. The data processing apparatus of claim 1, wherein a translation entry of the plurality of translation entries defines one of:
a read translation to be used for read accesses between a first read address and a second read address; and
a write translation to be used for write accesses between a first write address and a second write address, and
wherein the control information is encoded by presence of a valid write translation.

18. The data processing apparatus of claim 17, wherein the attribute is a modification flag indicative that data indicated by the page table entry has been modified, and
wherein the modification of the at least part of the control information corresponds to invalidating a corresponding write translation while retaining a corresponding read translation.

19. The data processing apparatus of claim 18, wherein the translation circuitry is adapted to:
when the lookup corresponds to a read access, return the corresponding second read address and initiate a read transaction based on the corresponding second read address independently of the control information;
when the lookup corresponds to a write access and the control information encodes the presence of a corresponding valid write translation, return a corresponding second write address, and initiate a write transaction based on the corresponding second write address.

20. A data processing apparatus comprising:
means for storing a plurality of translation entries in a cache, each translation entry corresponding to one of a plurality of page table entries and defining a translation between a first address and a second address, and encoding control information indicative of an attribute of each page table entry;
means for returning, in response to a lookup querying a first lookup address, a corresponding second address when the first lookup address corresponds to one of the plurality of translation entries stored in the cache;
means for modifying at least part of the control information associated with at least one translation entry already present in the cache in response to notification of a modification of the attribute of a page table entry corresponding to the at least one translation entry; and
means for retaining in the cache the at least one translation entry corresponding to the page table entry for use in a subsequent address lookup querying the first lookup address in response to the notification of the modification of the attribute in the page table entry.

21. A method of data processing:
storing a plurality of translation entries in a cache, each translation entry corresponding to one of a plurality of page table entries and defining a translation between a first address and a second address, and encoding control information indicative of an attribute of each page table entry;

returning, in response to a lookup querying a first lookup address, a corresponding second address when the first lookup address corresponds to one of the plurality of translation entries stored in the cache;

modifying at least part of the control information associated with at least one translation entry already present in the cache in response to notification of a modification of the attribute of a page table entry corresponding to the at least one translation entry; and retaining in the cache the at least one translation entry corresponding to the page table entry for use in a subsequent address lookup querying the first lookup address in response to the notification of the modification of the attribute in the page table entry.

* * * * *